(No Model.) 3 Sheets—Sheet 1.
F. E. THOMPSON & H. J. BINGHAM.
WEIGHING MACHINE.
No. 568,590. Patented Sept. 29, 1896.
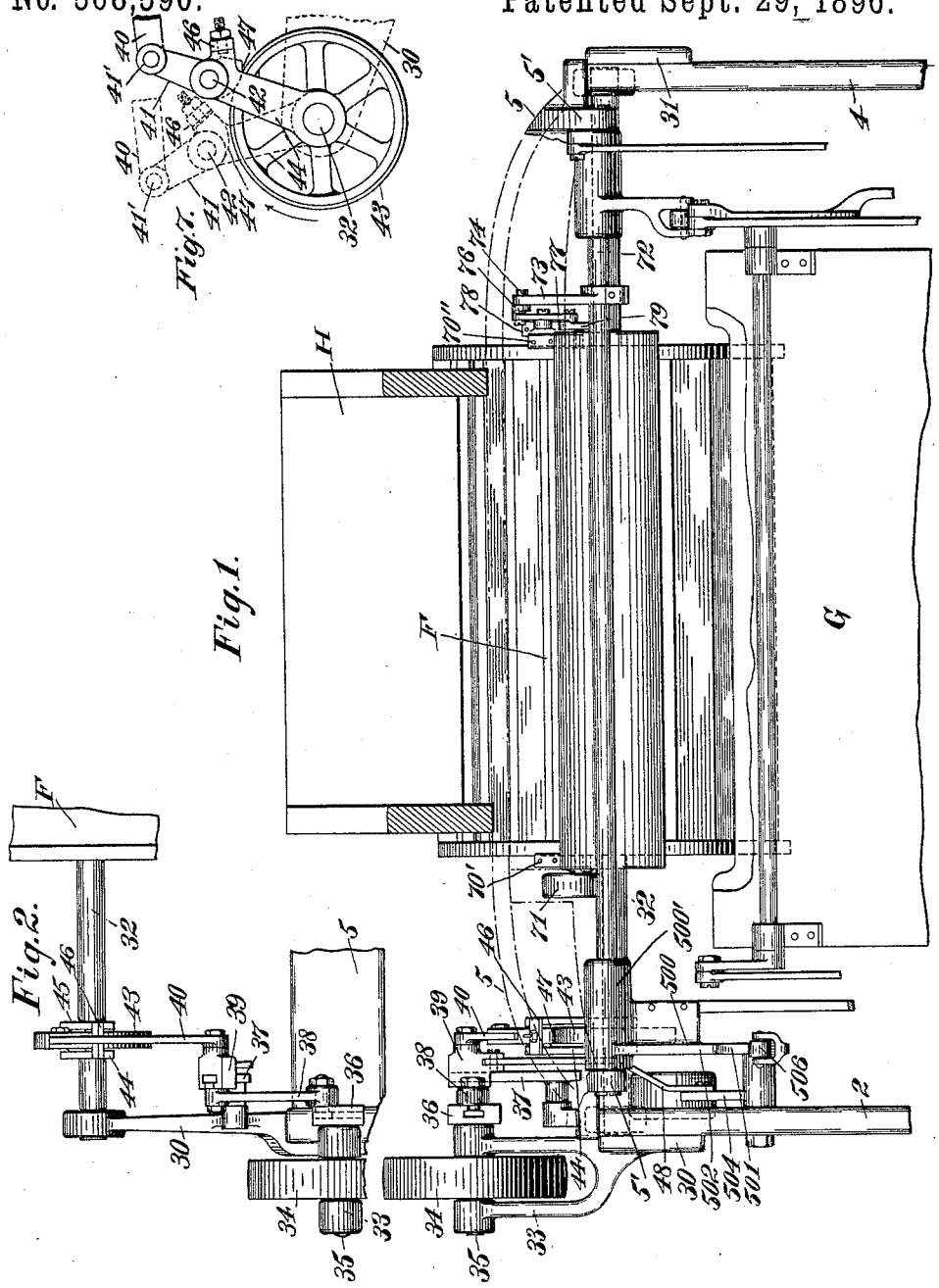
Witnesses:
Chas. D. King.
Fred. J. Dole.
Inventors:
Henry J. Bingham,
Frank E. Thompson:
By their Attorney.
F. H. Richards.

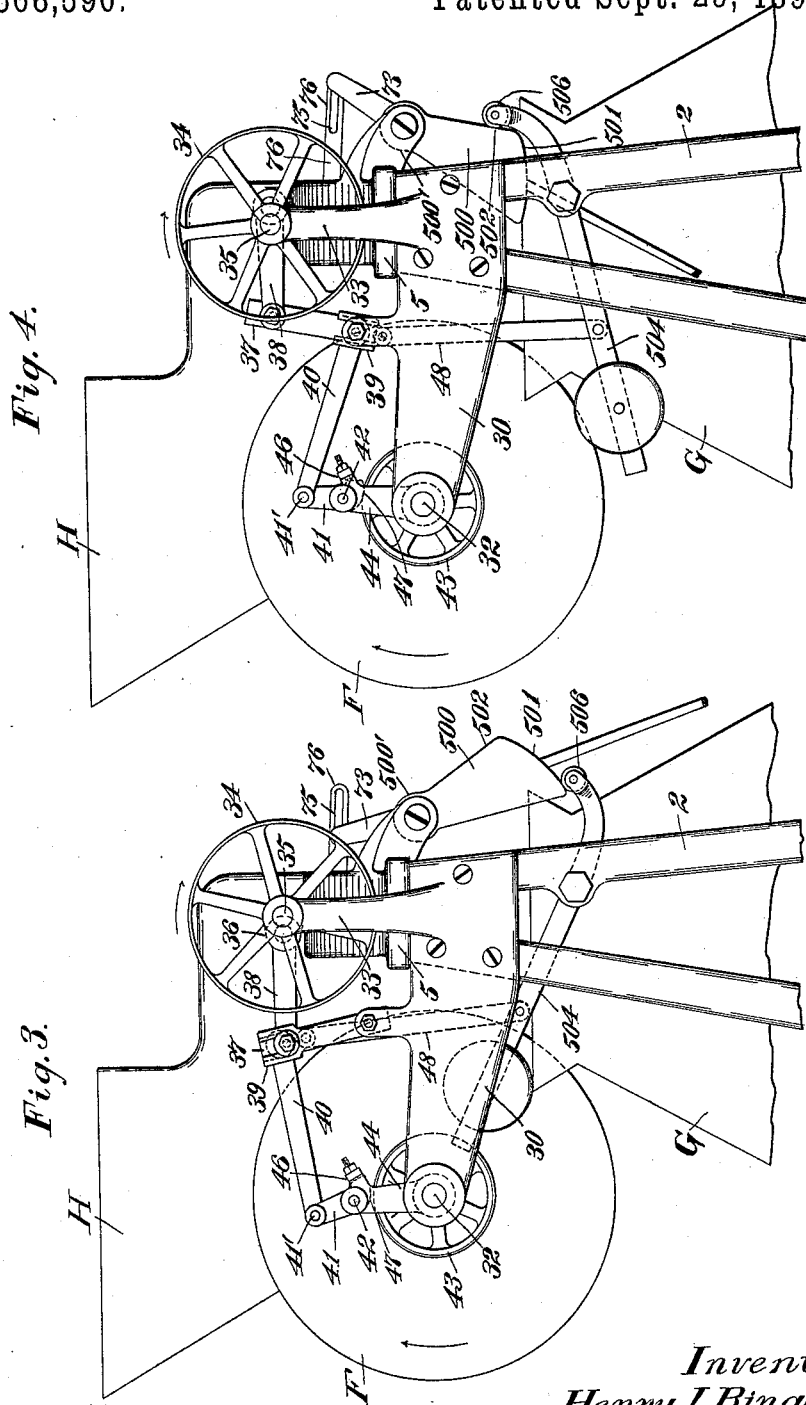

(No Model.) 3 Sheets—Sheet 3.
F. E. THOMPSON & H. J. BINGHAM.
WEIGHING MACHINE.
No. 568,590. Patented Sept. 29, 1896.
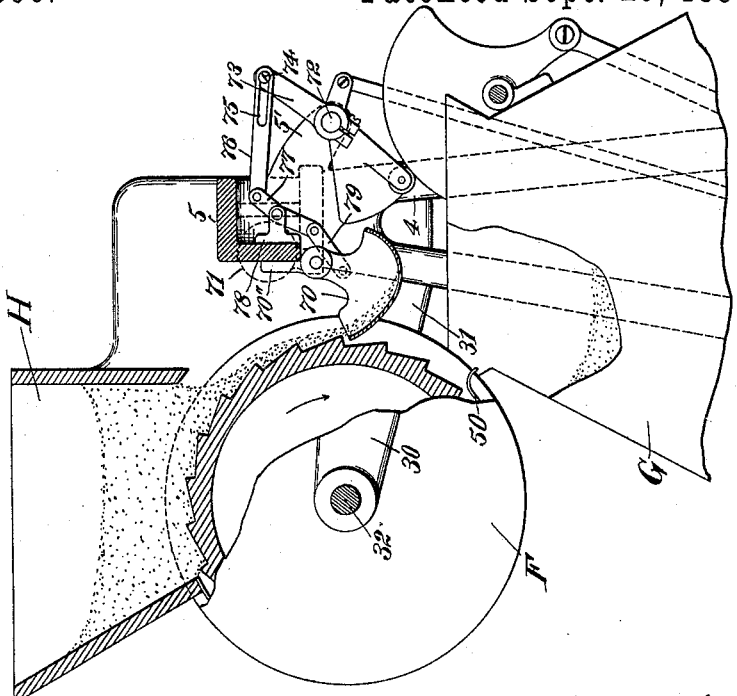
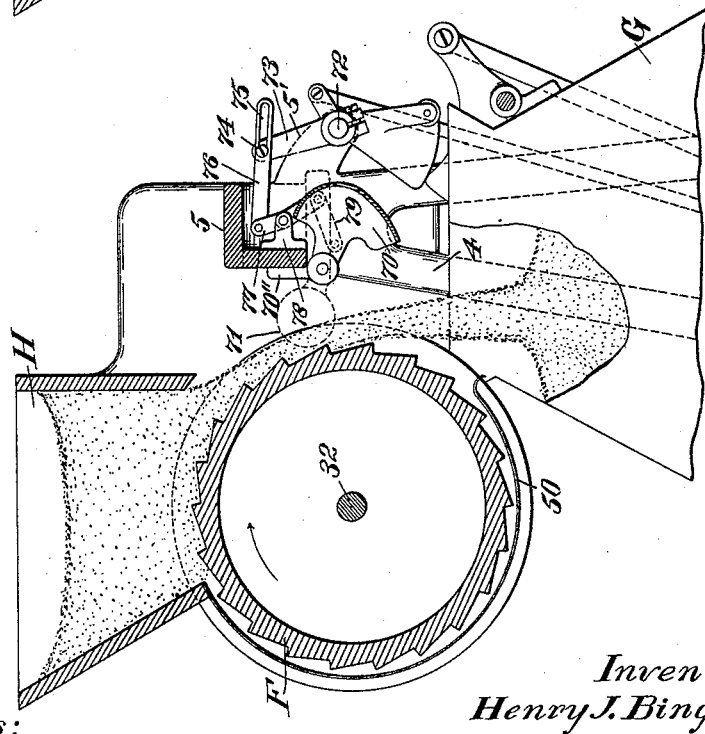
Witnesses:
Chas. D. King.
Fred. J. Dole.
Inventors:
Henry J. Bingham,
Frank E. Thompson;
By their Attorney,
F. H. Richards.

UNITED STATES PATENT OFFICE.

FRANK E. THOMPSON AND HENRY J. BINGHAM, OF HARTFORD, CONNECTICUT, ASSIGNORS TO THE PRATT & WHITNEY COMPANY, OF SAME PLACE.

WEIGHING-MACHINE.

SPECIFICATION forming part of Letters Patent No. 568,590, dated September 29, 1896.

Application filed March 9, 1896. Serial No. 582,465. (No model.)

*To all whom it may concern:*

Be it known that we, FRANK E. THOMPSON and HENRY J. BINGHAM, citizens of the United States, residing at Hartford, in the county of Hartford and State of Connecticut, have invented certain new and useful Improvements in Weighing-Machines, of which the following is a specification.

This invention relates to weighing-machines, and is particularly adapted for use in connection with machines for weighing sluggish and lumpy materials, the object being to provide an improved feeder or feeding device and improved feeder-actuating means for effecting a variable speed or movement of said feeder at predetermined points in the operation of the machine, whereby said feeder is adapted for feeding or forcing from a chute or other supply device a stream or supply of material of variable volume.

In the drawings accompanying and forming part of this specification, Figure 1 is a rear elevation of the upper part of a weighing-machine embodying our improvements. Fig. 2 is a detail plan view of a portion of the feeder-actuating mechanism. Fig. 3 is an end elevation as seen from the left in Fig. 1, illustrating the positions assumed by the various operative mechanisms when the feeder is driven at its maximum speed. Fig. 4 is a similar view illustrating the positions assumed by said mechanisms when the feeder is at rest. Figs. 5 and 6 are similar views, parts of the machine being in central vertical section for the purpose of illustrating certain mechanisms not shown in Figs. 3 and 4. Fig. 7 is a detail view showing by full and dotted lines the active and inactive positions of the feeder-operating means.

Similar characters designate like parts in all the figures of the drawings.

For convenience in illustrating the nature and purpose of our present improvements we have illustrated the same in connection with a weighing-machine of the type disclosed in Letters Patent No. 548,840, granted Francis H. Richards October 29, 1895. The invention is not, however, limited to weighing machines or mechanisms, but is capable of application to various machines requiring a variable-speed feeder.

The upper parts of two side frames or sections for supporting the operative parts of the weighing machine or mechanism are shown in the drawings and are designated, respectively, by 2 and 4, and are also illustrated connected by the top plate or beam 5, which carries a supply-chute or hopper H for containing the mass of material to be weighed. This material may be supplied to the chute or hopper H in some suitable manner—as, for example, by an elevator—and from thence will be directed into the bucket or load-carrying receptacle of the machine, which is designated in a general way by G, and which receptacle, in practice, is supported for ascending and descending movement between the side frames 2 and 4, suitably-sustained beam mechanism (not shown) being provided for this purpose.

In weighing certain classes of materials—such as cotton-seed meal, flaxseed, &c.—it is impossible to properly maintain a supply-stream to the bucket of the weighing-machine, owing to the failure of such materials to flow from the chute or hopper when the outlet thereof has been reduced to a certain size by the stream-controlling valve or valves. To overcome this and similar obstacles it is therefore one of the aims of our present invention to provide a variable-speed feeder, operable for feeding from a chute or other supply device a stream of variable volume into the bucket of the weighing-machine.

At the commencement of operation of the weighing-machine, or when the bucket is empty, the feeder will be driven at its highest speed or efficiency, whereby a stream of relatively large volume will be fed or forced into the bucket, the speed of the feeder being progressively decreased as the bucket-load is being completed and descends, the result being a corresponding diminution in volume of the supply-stream. At the commencement of the poising period the stream will be an attenuated one, corresponding with what is known in a valved machine as the "drip-stream." On the completion of the bucket-load the feeder will be instantly stopped, followed, of course, by a stoppage of the fed stream of material.

The side frames 2 and 4 are illustrated provided with the forwardly-extending brackets or arms 30 and 31, respectively, which constitute a means for supporting the feeder, which latter is designated in a general way by F.

The feeder will be secured to the shaft 32 by any suitable means for rotation therewith, the opposite ends of said shaft 32 being journaled in the brackets or arms 30 and 31 of the framework. The feeder F in the form herein illustrated consists of a corrugated roll, and, as indicated in Figs. 5 and 6, it constitutes a bottom or traveling floor for the chute or hopper H, the spaces between the corrugations forming pockets for the lodgment of portions of the mass. As the feeder rotates in the direction of the arrow the under part of the material supported thereby in the chute will be carried with said feeder, and on the continued rotation of the latter the mass will drop from said feeder into the bucket G, the receiving mouth or opening of said bucket being approximately in alinement with the descending stream of material from the feeder. By reason of the peculiar construction of the feeder the mass in the chute will be thoroughly agitated thereby, which insures the feeding of a steady stream into the bucket.

For effecting a variable speed of the feeder F we prefer to employ the means illustrated, which is in the nature of a multiplex linkage-actuating mechanism and is also preferably operatively connected with some movable member of the weighing mechanism, so that changes in the speed of said feeder may be automatically controlled and governed from said mechanism at proper points in the operation thereof.

The bracket 30 is illustrated having formed thereon a bifurcated bracket or support 33, between the branches or members of which a drive wheel or pulley 34, constituting a power or power-communicating device, is shown rotatively supported, the shaft 35 of which is journaled in said bracket members. The shaft 35 is illustrated extended beyond the inner member of the bracket 33, and it is also shown provided with a crank 36, the wrist-pin of which is preferably adjustable toward and from the axis of movement of the pulley 34 for the purpose of decreasing or increasing the effective stroke of a member which may be operatively connected therewith, although, as is obvious, other devices, among which may be mentioned a shiftable-stroke eccentric, could be substituted for the crank, if deemed necessary. The pulley 34 may be operatively connected by a belt with some suitable form of motor, (not shown,) or its periphery may be toothed and geared to said motor.

The framework is shown carrying a movably-supported stroke-transmitter (herein shown as a vibratory or oscillatory arm 37) pivotally supported by the bracket 30 and operatively connected, respectively, with the pulley 34 and with the feeder F.

The crank 36 is illustrated pivotally carrying the connecting link or strap 38, the opposite end of the latter being likewise connected to the stroke-transmitter 37 at a point near the upper or free end thereof.

The direction of movement of the pulley is indicated by the arrow in Figs. 3 and 4, and it will be evident that as said pulley rotates in the direction indicated a reciprocatory or vibratory movement will be imparted to the stroke-transmitter 37 through the medium of the crank 36 and connecting strap or link 38 in a well-known manner.

The length of stroke or radius of movement of the member 37 at its point of connection with the connecting-strap 38, it will be obvious, is equal to that of said connecting-strap, and it will be evident that at points on said member 37 near its center or axis of movement the arcs described by such points, and hence the strokes at said points, will be less than at the points of connection between said members, and that said member has no stroke or vibratory movement at all at its center of motion.

The vibratory stroke of the member 37 will be transmitted to the feeder F through a reciprocatory member 39, (herein illustrated as a block vertically slidable on said member 37,) respectively connected with said feeder and with some reciprocatory member of the weighing mechanism, (illustrated herein as the valve-closing lever 504,) so that as said block is moved from and toward the axis of movement of the member 37 the speed of the feeder may be correspondingly varied by imparting a greater or less stroke to said feeder through the slidable block 39.

A connecting-link is illustrated at 40, pivotally connected with the slidable member 39 and with a toggle member 41, which member 41 is shown extending below the toggle-pivot 42 and having formed thereon the cam 47, the periphery or frictional working face of which is preferably of leather or some suitable material—or it may be roughened—and engages the wheel or pulley 43, which is shown carried by and rotative with the feeder-supporting shaft 32, the periphery or tread of said wheel 43 being preferably of rubber or analogous material, or it may be knurled or roughened.

The second member of the toggle, to which reference has been made, consists of the two arms 44 and 45, connected by the bridge-piece 46 for movement in unison and between which the pulley 43 is rotative, the lower ends of the two links being freely or loosely movable about the feeder-shaft 32.

The actuating-cam 47 has alternately effective and ineffective movements. When the various operative mechanisms have reached the limits of their forward strokes, as indicated in Fig. 3, the three toggle-pivots 41', 42, and 32 will be out of line, the toggle having been slightly flexed or broken by the connecting-link 40 on its forward reciprocation, so that the working face of the actuating-cam 47 will not be in actual contact with the periphery of the wheel 43. On the rearward or working stroke, however, of the link 40 the three toggle-pivots are immediately thrown into line thereby, and the working face of the cam 47 in peripheral contact with the wheel 43, whereby said wheel, and hence the feeder F, will be driven by the cam 47, which is indirectly connected with the power-wheel 34. On the initial forward movement of the connecting-link 40 the toggle will be instantly broken and the three pivots thereof thrown out of line, and the working face of the cam 47 out of contact with the periphery of the wheel 43, so that on said forward stroke the cam 47 will be ineffective as a means for rotating the wheel 43, and hence the connected feeder F.

As hereinbefore described, the farther away from the center of movement of the stroke-transmitter 37 the sliding block 39 may be the greater will be the radius of movement described by said block, hence imparting a greater stroke to the link 40; and as said block is moved toward the center of movement the stroke transmitted to said connecting-link, it is evident, will be likewise less, the radius of movement of the actuating-cam 47 decreasing in correspondence therewith, the consequence being that as the strokes of these connected members are diminished the speed of the feeder will be correspondingly reduced, and when the axis of the sliding block 39 has reached the "dead-center" position, or is coincident with the center of movement of the member 37, it will be apparent that the stroke of the latter will not be transmitted to the connecting-link 40, the natural result being a stoppage of the feeder F.

On the stoppage of the feeder particles of the mass thereon, at points a little to the right of a vertical central line passing therethrough, generally gravitate toward the loaded bucket, and it is essential that these should be prevented from falling into said loaded bucket to prevent overloading thereof, whereby the bucket-load discharged will be inaccurate and not a true one. For catching these particles of the mass we have herein illustrated a valve 70, which is normally located at one side of the line of flow of the stream of material from the rotating feeder F, as seen in Fig. 5, so that the stream may flow or descend unimpeded into the bucket. On the stoppage of the feeder the valve 70 will be instantly projected across the line of flow of the supply-stream, as shown in Fig. 6, and will catch the drizzle which drops from said feeder. The valve is pivotally supported by the two brackets 70' and 70", which are suitably secured to the inner faces of the web of the top plate or beam 5, the valve carrying a balance-weight 71 above the pivot or center of movement thereof, the center of gravity of which is substantially coincident with a vertical line passing through the center of movement of said valve, so that the valve has in itself no tendency to either open or close when in either of its two positions, said weight 71 maintaining the valve in either its open or closed positions. As a means for moving said valve 70 toward the line of flow of the supply-stream, valve-actuating mechanism, substantially similar to that disclosed in Letters Patent No. 548,843, granted to Francis H. Richards October 29, 1895, is illustrated and will be preferably employed.

A transverse shaft 72, constituting a valve-actuating shaft, is illustrated supported for rocking movement between arms 5', formed on the top plate 5 of the machine and carrying, near the left-hand outer end thereof, the valve-closing cam 500, the hub 500' of which is suitably secured to said shaft 72. The shaft 72, near the opposite end thereof, is provided with the upwardly-extending rock-arm 73, (shown as clamped thereto,) which rock-arm 73 is provided, at a point near the upper end thereof, with a stop in the form of a headed screw 74, which passes through the longitudinal slot 75 of the link 76, the opposite end of the latter being shown pivotally connected with the lever 77.

The lever 77 is illustrated fulcrumed on the bracket 78, carried by the top plate 5, and also connected pivotally with a second link 79, which is also pivotally connected with the valve or catch receptacle 70 at a point below the center of movement thereof.

The valve-closing cam 500 is shown having the two connected cam-faces 501 and 502, the latter of which is of relatively greater efficiency than the former, which are in positions to be engaged by the valve-closing actuator.

A valve-closing actuator or lever is shown at 504 pivoted to the side frame 2. The end of the rear arm is illustrated provided with an antifriction-roll 506, the forward arm of said lever being counterweighted and pivotally connected by means of the connecting strap or link 48 with the slidable block 39.

At the commencement of operation the roll 506 will be in the position illustrated in Fig. 3 and the slidable block 39 in the position indicated in said Fig. 3 and also in Fig. 1. The tendency of the longer arm of the lever 504, by reason of the counterweight thereof, is to descend, and as this lever descends the roll 506 on the short arm thereof will ride along the cam-surface of the cam 500, and successively in contact with the connected cam-faces 501 and 502 thereof, for effecting the closure or movement of the valve 70 toward the line of flow of the supply-stream, in a manner to be hereinafter described. As the weighted arm of the lever 504 descends the block 39 will be moved nearer toward the center of movement of the stroke-transmitter 37 through the agency of the connecting link or strap 48, and as said member approaches the center of movement of the stroke-transmitter 37 the result will be a shortening in the stroke of the link 40, and hence the effective movement of the cam 47, which is operatively connected with said link 40, and which drives the wheel 43, these strokes being progressively decreased as the bucket-load is being completed, the result being a proportionate decrease in speed of the feeder F and a like diminution in volume of the supply-stream. On the completion of the bucket-load the axes of the sliding block 39 and stroke-transmitter 37 will be in alinement, so that no stroke or movement will be imparted to the link 40 by the the member 37, though it continues to vibrate.

As the roll 506 rides over the cam-face 501 the cam 500, and hence the valve-actuating shaft 72, will be slowly rocked, means (not shown) being provided for limiting the rocking movement of said connected members. The direction of rocking movement of the cam 500 on the closing of the valve is herein shown as the "left," and it will be evident that the rock-arm 73 on the valve-actuating shaft 72 will be thereby oppositely moved, or to what is herein indicated as the "right."

At the commencement of operation of the machine the valve will be maintained in its open position through the medium of the balance-weight 71 thereof, and during the greater portion of the operation the stop or projection 74 will move between the longitudinal walls of the slot 75, so that such position of the valve will not be affected.

At the commencement of the poising operation of the machine the stop 74 will abut against the end wall of the slot 75, the roll 506 at this point in the operation of the machine being at about the intersection of the two cam-faces 501 and 502, the valve being momentarily held against further closing movement by suitable means (not shown) to permit the flow of the drip or reduced stream into the bucket to complete the partial load therein, and the sliding block 39 being at a point on the stroke-transmitter adjacent to the center of movement thereof, whereby the feeder will be driven at a very slow speed.

At the close of the poising period the valve 70 is released, and the roll 506, leaving the cam-face 501, engages the cam-face 502, whereby said cam will be quickly oscillated to the left and the rock-arm 73 oppositely moved, the stop 74 drawing the connecting-link 76 to the right and rocking the lever 77 about its pivot, whereby the lower arm of said lever will exert a downward thrust on the link 79 and the valve 70 will be closed or projected across the line of flow of the supply-stream. During this last-mentioned operation the weighted arm of the valve-closing lever 504 of course descends, and the block 39 will be drawn downward on the stroke-transmitter 37 until the axes coincide, in the manner previously described, whereby the feeder F will be stopped in its movement, the valve 70 catching the drizzle or spray which drops therefrom.

For opening or moving the valve away from the line of flow of the supply-stream any suitable valve-actuating mechanism will be employed—for example, that disclosed in Letters Patent No. 548,839, granted October 29, 1895, to Francis H. Richards.

Means are also provided for preventing waste of the material, said means being shown as the semicircular guard or plate 50, secured to the lower edge of the front wall of the chute H and extending partially about the feeder F, the lip or lower edge of said guard 50 extending over and through an opening formed in the front wall of the bucket G at the upper edge thereof.

It is obvious that the mechanism for effecting the variable stroke of the feeder can be variously modified without departure from the spirit of our invention, and hence we do not limit ourselves to the precise devices shown and described for accomplishing this purpose.

Having thus described our invention, we claim—

1. In a machine of the class specified embodying weighing mechanism, the combination with a chute, of a rotary corrugated roll constituting a bottom for said chute and operable for feeding a stream of material from said chute; means for rotating said roll; and means operatively connected with the weighing mechanism for varying the speed of said roll.

2. The combination with a feeder, of a power device therefor; a stroke-transmitter operatively connected with said power device and feeder; weighing mechanism; and means controlled by said mechanism for varying the feed.

3. In a machine of the class specified, embodying weighing mechanism, the combination of a feeder; a power device; a movably-supported stroke-transmitter operatively connected with said power device; a movable member on said stroke-transmitter; connections between said member and feeder; and means also connecting said member with the weighing mechanism.

4. In a machine of the class specified, the combination with a feeder, of a power device; a stroke-transmitter operatively connected with said power device; a block movable on said transmitter; connections between said block and feeder; a valve and its valve-actuator; and means operatively connecting said block and valve-actuator.

5. The combination with a feeder; of a toggle, one member of which is provided with a device for actuating said feeder; a power device; a movably-supported stroke-transmitter operatively connected with said power device and toggle; and a sliding member connected to said stroke-transmitter.

6. In a machine of the class specified, the combination with a feeder; of a toggle, one member of which is provided with means for actuating said feeder; a power device; a movably-supported stroke-transmitter operatively connected with said power device; a movable member carried by said stroke-transmitter; and connections between said movable member and toggle.

7. In a machine of the class specified, the combination with a pulley and its supporting-shaft, and with a feeder; of a crank carried by said pulley-shaft; a movably-supported member; a link operatively connecting said member and crank; a movable block carried by said member; and connections between said block and the feeder.

8. In a machine of the class specified, the combination with a pulley and its supporting-shaft, and with a feeder; of a movably-supported member; a crank on said pulley-shaft; a link connecting said member and crank; a slidable member carried by said movably-supported member; a toggle, one member of which is provided with a cam constituting a means for actuating the feeder; and a connecting-link operatively connecting said toggle and slidable member.

9. The combination with a feeder; of a toggle, one member of which is provided with a device for actuating said feeder; a power device; a movably-supported stroke-transmitter operatively connected with said power device; a sliding member carried by said stroke-transmitter; a link operatively connected with said sliding member and toggle; and means for moving said sliding member along said stroke-transmitter.

10. The combination with a feeder and with actuating means therefor, of a stroke-transmitter; a power device operatively connected with said stroke-transmitter; a slidable member connected to said stroke-transmitter; and a connection between said slidable member and feeder-actuating means.

11. The combination with a feeder and its shaft provided with a pulley; of a toggle, one member of which is supported by said shaft, and the other member of which is provided with a cam for engaging the periphery of said pulley; a movably-supported stroke-transmitter carrying a sliding block; a link operatively connecting said block and toggle; a shaft having a crank; and a link pivotally connected with said crank and stroke-transmitter.

12. The combination with a feeder and with a valve; of a valve-actuating shaft; a longitudinally-slotted link; connections between said link and valve; an arm on said valve-actuating shaft, said arm being provided with a stop projecting through the slot of said link; and means for operating said shaft.

13. The combination with a feeder and with a valve; of a valve-actuating shaft; a lever; an arm carried by said shaft and provided with a stop; a link operatively connecting one end of said lever with the valve; and a link connected with the opposite end of the lever and provided with a longitudinal slot through which the stop on the arm projects; and means for operating said shaft.

14. The combination with a valve, of a lever connected with the valve; a link; a valve-actuating shaft; and an arm carried by said shaft and carrying a stop in sliding connection with the link.

15. The combination with a rocking valve, of a pivoted lever connected with the valve; a longitudinally-slotted link; and a movable member having a projection traveling in the slot of the link; and means for actuating said mechanism.

FRANK E. THOMPSON.
HENRY J. BINGHAM.

Witnesses:
FRED. J. DOLE,
S. W. POTTS.